United States Patent [19]

Rich

[11] Patent Number: 5,307,517
[45] Date of Patent: Apr. 26, 1994

[54] ADAPTIVE NOTCH FILTER FOR FM INTERFERENCE CANCELLATION

[76] Inventor: David A. Rich, 845 Woodmere Ct., Woodmere, N.Y. 11598

[21] Appl. No.: 778,501

[22] Filed: Oct. 17, 1991

[51] Int. Cl.$^5$ .............................................. H04B 1/10
[52] U.S. Cl. .................................. 455/306; 455/295; 455/307
[58] Field of Search ............... 455/295, 296, 303, 305, 455/306, 307, 340, 304, 208, 209; 375/99, 103; 331/2; 333/176, 166

[56] References Cited

U.S. PATENT DOCUMENTS

| | | | |
|---|---|---|---|
| 2,903,693 | 9/1959 | Ley | 455/296 |
| 3,035,231 | 5/1962 | Neelands | 455/307 |
| 3,226,646 | 12/1965 | Ludwig . | |
| 3,723,883 | 3/1973 | Renner | 455/304 |
| 3,753,123 | 8/1973 | Carpenter | 455/304 |
| 3,911,366 | 10/1975 | Baghdady | 455/303 |
| 3,961,262 | 6/1976 | Gassman | 455/208 |
| 4,027,264 | 5/1977 | Gutleber | 328/167 |
| 4,053,932 | 10/1977 | Yamaguti | 358/167 |
| 4,067,013 | 1/1978 | Smith | 455/303 |
| 4,088,955 | 5/1978 | Baghdady | 455/303 |
| 4,135,159 | 1/1979 | Kubanoff | 455/305 |
| 4,249,261 | 2/1981 | Ogita | 455/305 |
| 4,270,223 | 5/1991 | Marston | 455/305 |
| 4,328,591 | 5/1991 | Baghdaddy | 455/303 |
| 4,349,919 | 9/1982 | Richardson | 455/23 |
| 4,453,137 | 6/1984 | Rittenbach | 331/2 |
| 4,513,249 | 4/1985 | Baghdady | 328/150 |
| 4,696,055 | 9/1987 | Marshall | 455/306 |
| 4,739,518 | 4/1988 | Bickley | 455/296 |
| 4,859,958 | 8/1989 | Myers | 329/112 |

FOREIGN PATENT DOCUMENTS 9114311 9/1991 PCT Int'l Appl. ................ 455/324

OTHER PUBLICATIONS

Bar-Ness (IEEE Com Feb. 1984).
El-Samie (IEEE Com Jun. 1983).
Bouvier (IEEE Com Feb. 1978).
Sundresh (IEEE Com Dec. 1977).
Cassara (IEEE Com Jun. 1980).
"Plessey Groundsat common channel Repeater", Jane's Defence Review vol. 2 No. 3 1981 pp. 225-227.

*Primary Examiner*—Reinhard J. Eisenzopf
*Assistant Examiner*—Mark D. Wisler
*Attorney, Agent, or Firm*—Allan Jacobson

[57] ABSTRACT

An improved adaptive notch filter for removing undesired cochannel FM interference includes in-phase and quadrature signal processing paths in which the undesired FM signal is translated to zero frequency, i.e. to DC. In each of the in-phase and quadrature phase signal paths, a first multiplier translates the input frequency spectrum in a dynamic manner so that the frequency of the undesired FM signal is always centered on DC. The undesired signal, now at DC, is filtered out by a high pass filter with a sharp rolloff. The output of the high pass filter is remultiplied in a second multiplier to translate the desired FM signal back to the original position in the frequency spectrum. In order to eliminate an unwanted difference frequency remodulation signal at the output of the second multiplier, the quadrature phase signal path performs a parallel operation on the same input signal, but with a quadrature phase (90 degree phase shift) control signal. The output the in-phase and quadrature signal processing circuits are combined in an adder circuit to cancel the unwanted difference frequency remodulation signal.

10 Claims, 9 Drawing Sheets

SCHEMATIC OF MULTIPLIER

SYMBOL FOR MULTIPLIER

ADAPTIVE NOTCH FILTER FOR FM INTERFERENCE CANCELLATION

FIELD OF THE INVENTION

The present invention is related to the field of adaptive notch filters, as for use in cochannel FM interference cancellation systems.

BACKGROUND OF THE INVENTION

FM cochannel interference cancellation systems are well known. The general problem of cochannel interference arises when two FM signals are so close in frequency as to interfere with each other, such as may occur in fringe areas between FM stations, or by deliberate jamming in communications systems. In a typical FM tuner, only the stronger of the two FM signals will be captured by the FM receiver. Furthermore, if the weaker signal is only slightly weaker than the stronger, a distorted stronger signal will result.

U.S. Pat. No. 3,911,366 to Baghdady discloses a system for suppressing interfering FM signals. The basic principle is to receive the undesired FM signal (typically the stronger FM signal), track its instantaneous frequency, and then control an adaptive notch filter to track and remove the undesired FM signal. Thus, the stronger FM signal can be removed. One of the keys to effective realization of a cochannel interference cancellation system is the implementation of the adaptive notch filter.

A fixed notch filter removes signal energy contained in a narrow band of frequencies. The fixed frequency of the notch is determined by the value of the circuit elements, as is well known to those skilled in the art. An adaptive notch filter which has an electrical control input to vary the center frequency of the notch, is more complex and difficult to implement than a fixed frequency notch filter. The adaptive notch filter shown by Baghdady uses a fixed frequency notch filter and two mixer circuits to create the effect of a controllable adaptive notch filter.

To realize an adaptive notch filter, the input signal is translated in the frequency spectrum, in a first mixer circuit, in a dynamic manner so that the frequency of the undesired FM signal is always centered on the fixed notch frequency of the notch filter. After the fixed frequency notch filter, the signal is translated in the frequency domain in a second mixer circuit back to its original position in the frequency spectrum.

The principle disadvantage of the adaptive notch filter disclosed by Baghdady, is that the system requires an accurate fixed frequency oscillator precisely equal to the center frequency of the notch. Specifically, the filter control signal is first heterodyned with the fixed frequency oscillator signal, then filtered to remove an unwanted difference term, in order to form the intermediate control signal which is then used as the local oscillator input to the two mixer circuits. Since the fixed center frequency of the notch must correspond exactly to the frequency of the fixed frequency oscillator, a notch filter with a very small stop band cannot be used because a small error in the instantaneous frequency of the local oscillator control signal will cause the notch stop band to miss the FM signal to rejected. Also, the analog approach of Baghdady does not lend itself to integrated circuit techniques.

SUMMARY OF THE INVENTION

The present invention is embodied in a method and apparatus for realizing an improved adaptive notch filter. In accordance with the present invention, the input signal is translated in the frequency spectrum, in a first multiplier circuit so that the frequency of the undesired FM signal is always centered on zero frequency, i.e., on DC. The undesired signal, now at baseband frequency, is filtered out by a high pass filter with a sharp rolloff. The output of the high pass filter is remultiplied with the same frequency control signal used in the first multiplier (the frequency of the undesired FM signal) in order to translate the desired FM signal back to the original position in the frequency spectrum.

An unwanted side effect of the remultiplication process is the creation of a difference frequency remodulation signal is canceled by performing a parallel filtering process using a quadrature phase clock, and adding the two resulting filtered signals. The filtered signal generated by the quadrature phase clock also contains the unwanted difference frequency signal, but it is 180 degrees out of phase with the counterpart in the in-phase generated signal, so that the two terms cancel leaving only the desired signal as the notch filter output.

An advantage of the adaptive notch filter in accordance with the present invention is that a fixed frequency oscillator is not required. Also, since signal filtering processing occurs in the low frequency portion of the spectrum, integrated circuit techniques may be used effectively. In addition, the bandwidth of the notch can be significantly reduced (the Q of the filter increased) because inductors with resistive losses are not used in the present invention.

DETAILED DESCRIPTION

Figure 1:
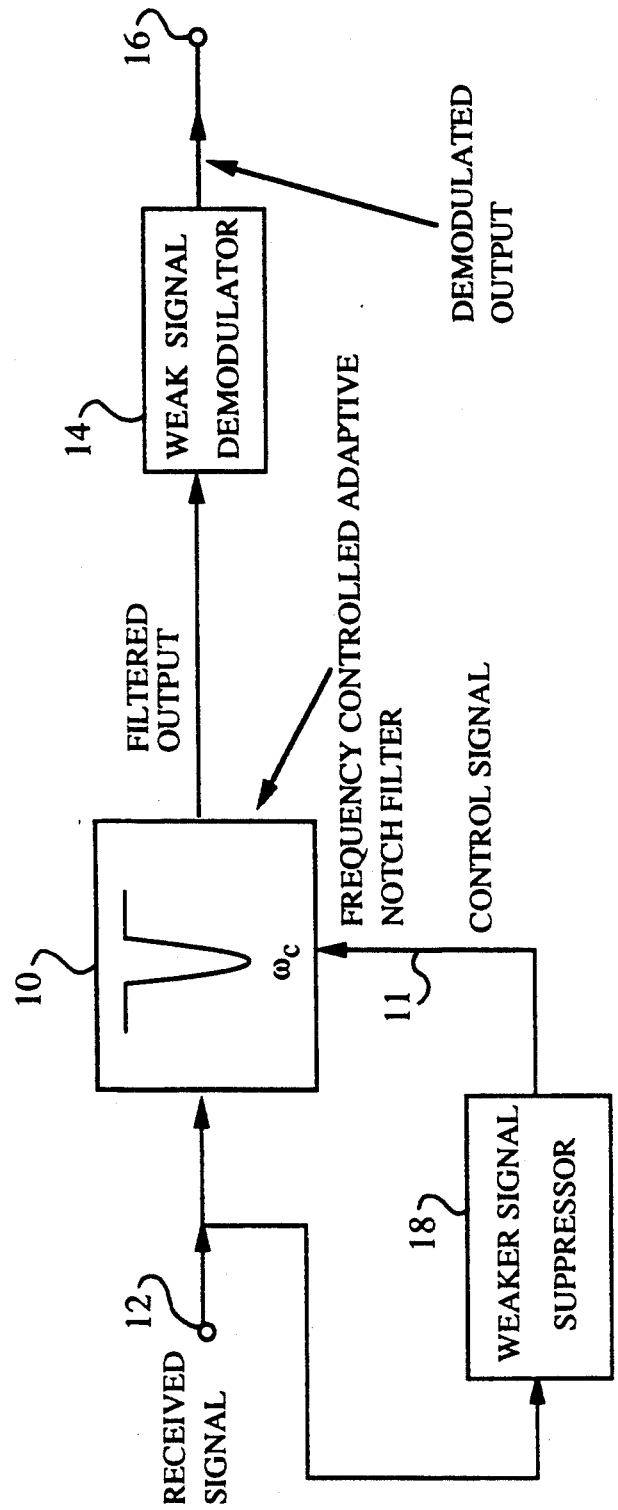
FIG. 1 is a block diagram of a prior art FM cochannel interference cancellation system.

A well known type of FM cochannel interference cancellation system is shown in FIG. 1. The heat of the system is a frequency controlled adaptive notch filter 10 which filters out energy in a narrow band of frequencies centered around the notch frequency, Wc. The frequency of the notch Wc is not fixed, but is adjustable in accordance with a control signal input 11. The instantaneous angular frequency of the control signal input 11 determines the frequency at which the stop band of notch will be centered.

The operation of an adaptive notch filter in an FM cochannel interference cancellation system relies on the principle of heterodyning, or multiplying, two sinusoidal signals in a mixer. When two sinusoidal input signals are multiplied in a non-linear circuit element, such as a mixer or multiplier, the output contains sinusoidal functions of both the sum and the difference of the two input frequencies. Usually, when only one of the sum or difference signal frequencies is of interest, the other sum or difference signal frequency is removed by filtering. A weaker signal suppressor 18, coupled to the receive signal on terminal 12 provides the control signal 11 to the adaptive notch filter 10. In operation, a receive signal on terminal 12 is applied to the weaker signal suppressor 18. The weak signal suppressor attempts to remove the weaker signal from the composite signal. The output of the weak signal suppressor is applied to the control terminal 11 of adaptive notch filter 10. In such manner, the center of the adaptive notched filter Wc is an estimate of the instantaneous frequency of the stronger signal. The filtered output of the adaptive notch filter 10 contains substantially only the weaker FM signal, the stronger FM signal having been filtered out by the agile notch frequency Wc of the adaptive notch filter 10. After the notch filter 10, a weak signal demodulator 14 provides the demodulated output of the weaker FM signal substantially without interference from the stronger FM signal on terminal 16.

Figure 2:
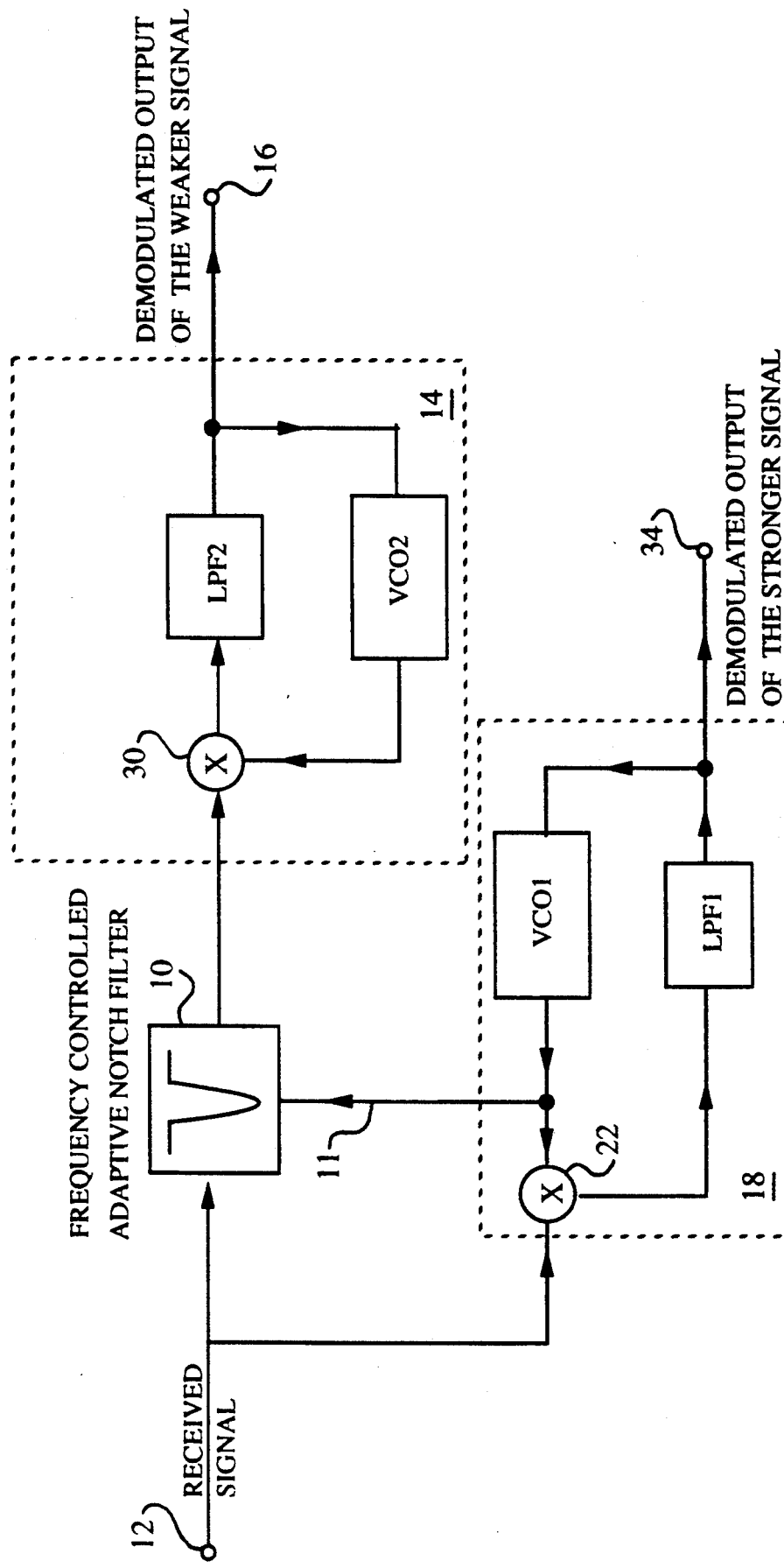
FIG. 2 is a block diagram of an FM cochannel interference cancellation system using phase locked loops.

An embodiment of an FM cochannel interference cancellation system using a pair of phase locked loops to detect the weak signal and the strong signal is shown in FIG. 2. The weaker signal suppressor 18 is a first phase locked loop comprising a mixer 22, a first voltage controlled oscillator VCO1 and a first low pass filter LPF1. Similarly, the weak signal demodulator 14 comprises a second phase locked loop including a mixer 30, a second voltage controlled oscillator VCO2, and a second low pass filter LPF2. The use of phase locked loops to demodulate an FM signal is well known to those skilled in the art. The first phase locked loop 18 tracks the stronger FM signal, providing a demodulated output of the stronger signal on terminal 34. At the same time, the first phase locked loop 18 provides an output control signal 11 to the control terminal of the adaptive notch filter 10, having an instantaneous angular frequency essentially equal to the instantaneous angular frequency of the stronger FM signal. Thus, the adaptive notch filter 10 removes the stronger FM signal, thereby providing an output consisting of the weaker FM signal to the input of the second phase locked loop 14. The output of the second phase locked loop 14 is the demodulated output of the weaker signal at terminal 16.

Figure 5:
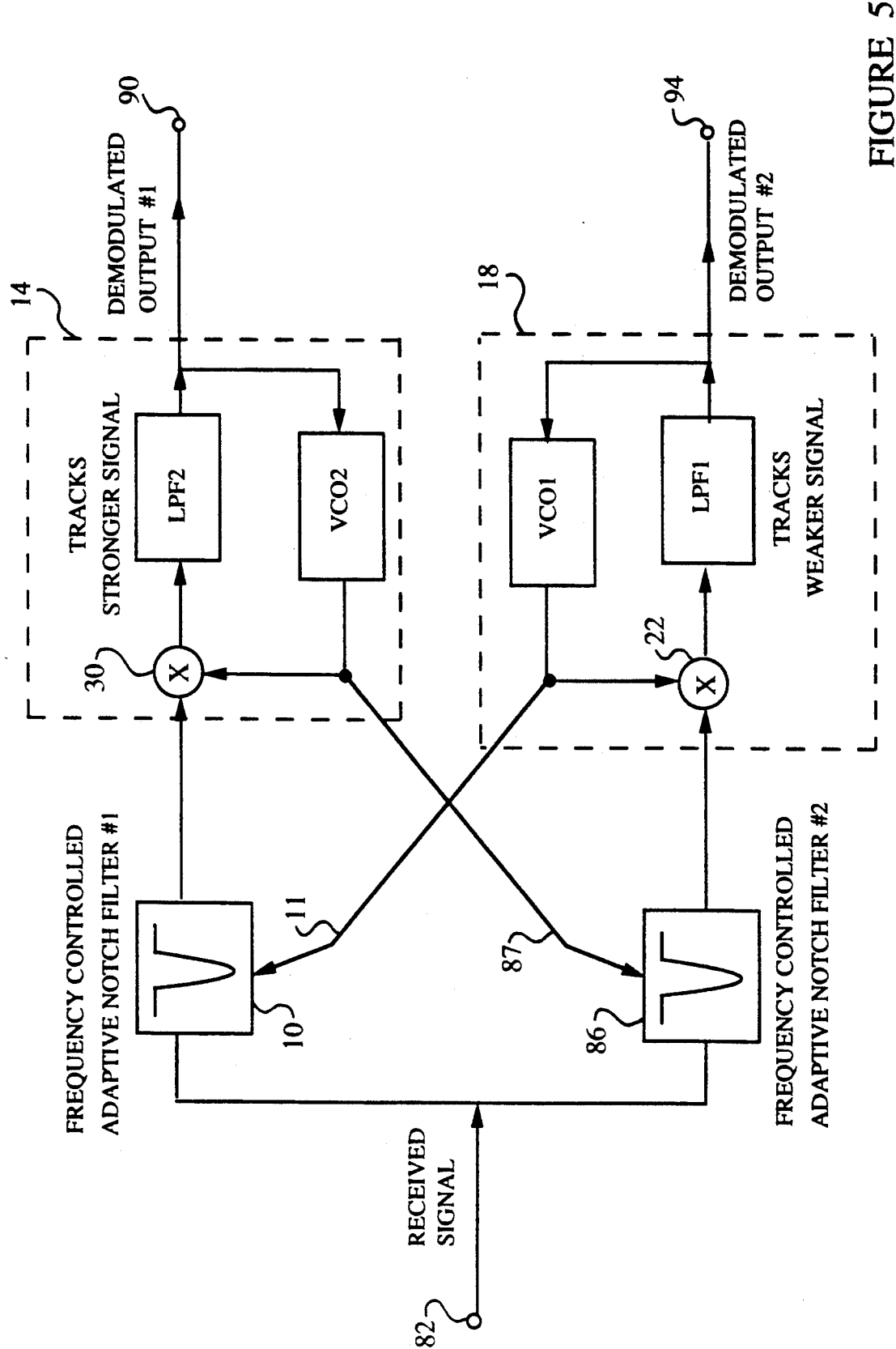
FIG. 5 is a block diagram of a cross coupled FM cochannel interference cancellation system.

A pair of adaptive notch filters can be used in a cross coupled, closed loop arrangement as shown in FIG. 5. The system arrangement of FIG. 5 is similar to that of FIG. 2, except that an additional adaptive notch filter 86 is inserted between the receive signal on terminal 82 and the input to the first phase locked loop 18. The control terminal 87 of the second adaptive notch filter 86 is coupled to the second phase locked loop 14. The output of the second phase locked loop 14 on the control terminal 87 of the adaptive notch filter 86 is a signal having an instantaneous angular frequency essentially equal to the instantaneous angular frequency of the stronger FM signal. Thus, adaptive notch filter 10 removes the weaker FM signal from the input to the second phase locked loop 14, while adaptive notch filter 86 removes the stronger FM signal from the input to the first phase locked loop 18. The mutual cross coupled removal of the interfering signal results in the improved detection of both the weaker and the stronger FM signals at output terminals 94 and 90 respectively when the amplitude of the two signals are similar.

Figure 3:
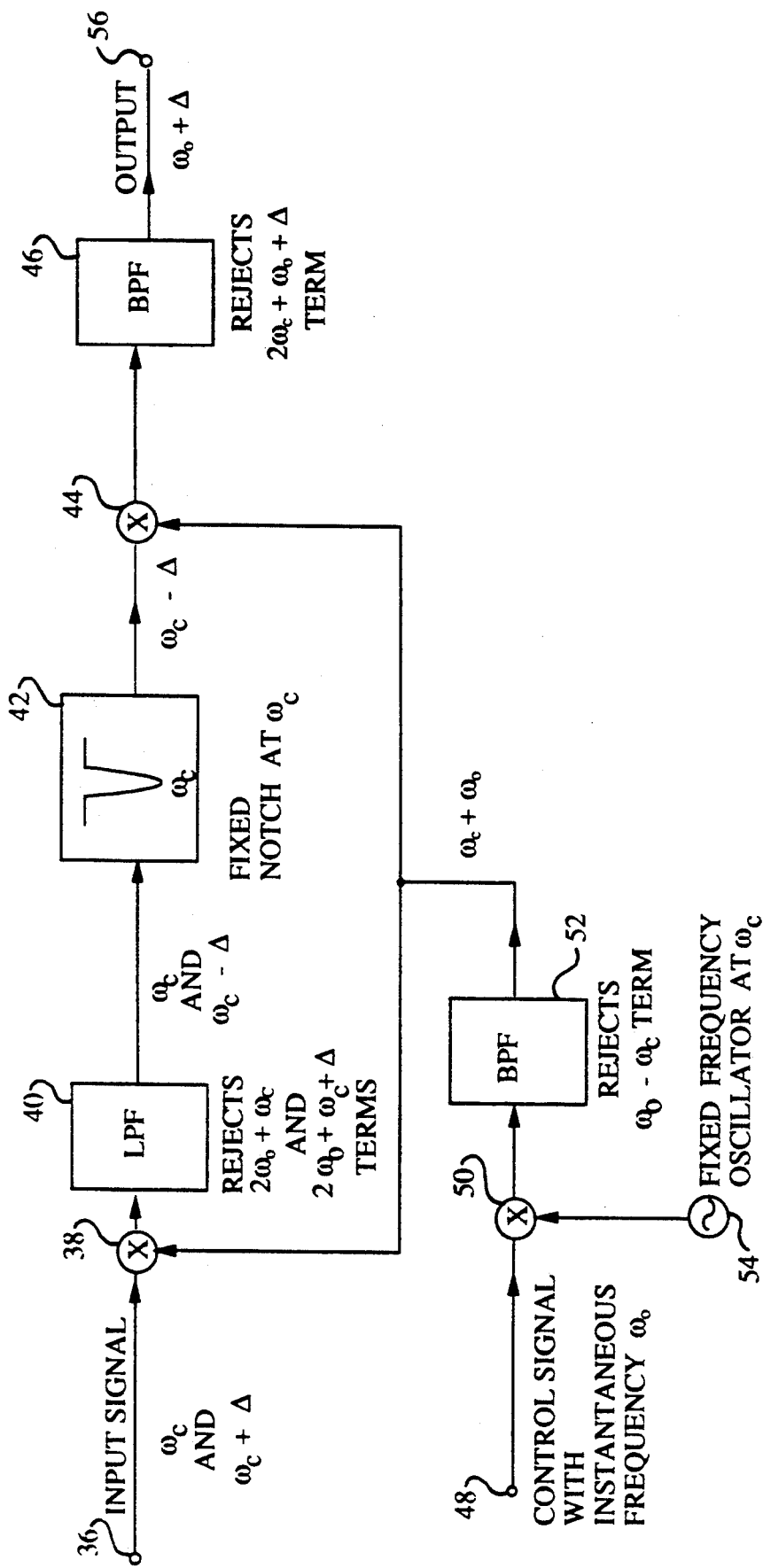
FIG. 3 is a block diagram of a prior art adaptive notch filter.

An adaptive notch filter of the type shown by Baghdady in U.S. Pat. No. 3,911,336 is shown in FIG. 3. A control signal on terminal 48 is multiplied in a mixer 50 with the output of a fixed frequency Wc oscillator 54. After the band pass filter 52 removes the difference frequency term, the result is applied to one input of mixer 38 and one input of mixer 44. The other input of mixer 38 is coupled to the input terminal 36. The output of mixer 38, after filtering in low pass filter 40, is coupled to the input of a fixed notch filter 42. The frequency of the fixed notch filter, Wc, is precisely equal to the frequency Wc of the fixed oscillator 54. The output of the fixed frequency notch filter 42 is coupled to the other input of mixer 44. The output of mixer 44 is filtered in band pass filter 46 and thereafter coupled to the output terminal 56.

In operation, an input signal having interfering strong and weak FM signals is coupled to input terminal 36. An estimate of the stronger FM signal instantaneous angular frequency, Wo, is coupled to the control terminal 48. The frequency at the output of band pass filter 52 is the sum of Wo plus Wc. Mixer 38 translates the received signal in the frequency spectrum in such manner that the interfering stronger FM signal is always centered on the frequency Wc of the fixed notch filter. Thus, adaptive notch filter 42 removes the stronger FM signal, leaving only the weaker FM signal. Mixer 44 retranslates the weaker FM signal on the output of adaptive notch filter 42 back to its position in the frequency spectrum which it originally occupied before the translation in mixer 44. The unwanted frequency sum product produced by mixer 44 is removed in band pass filter 46, so that the output at terminal 56 is just the weaker FM signal.

Figure 4:
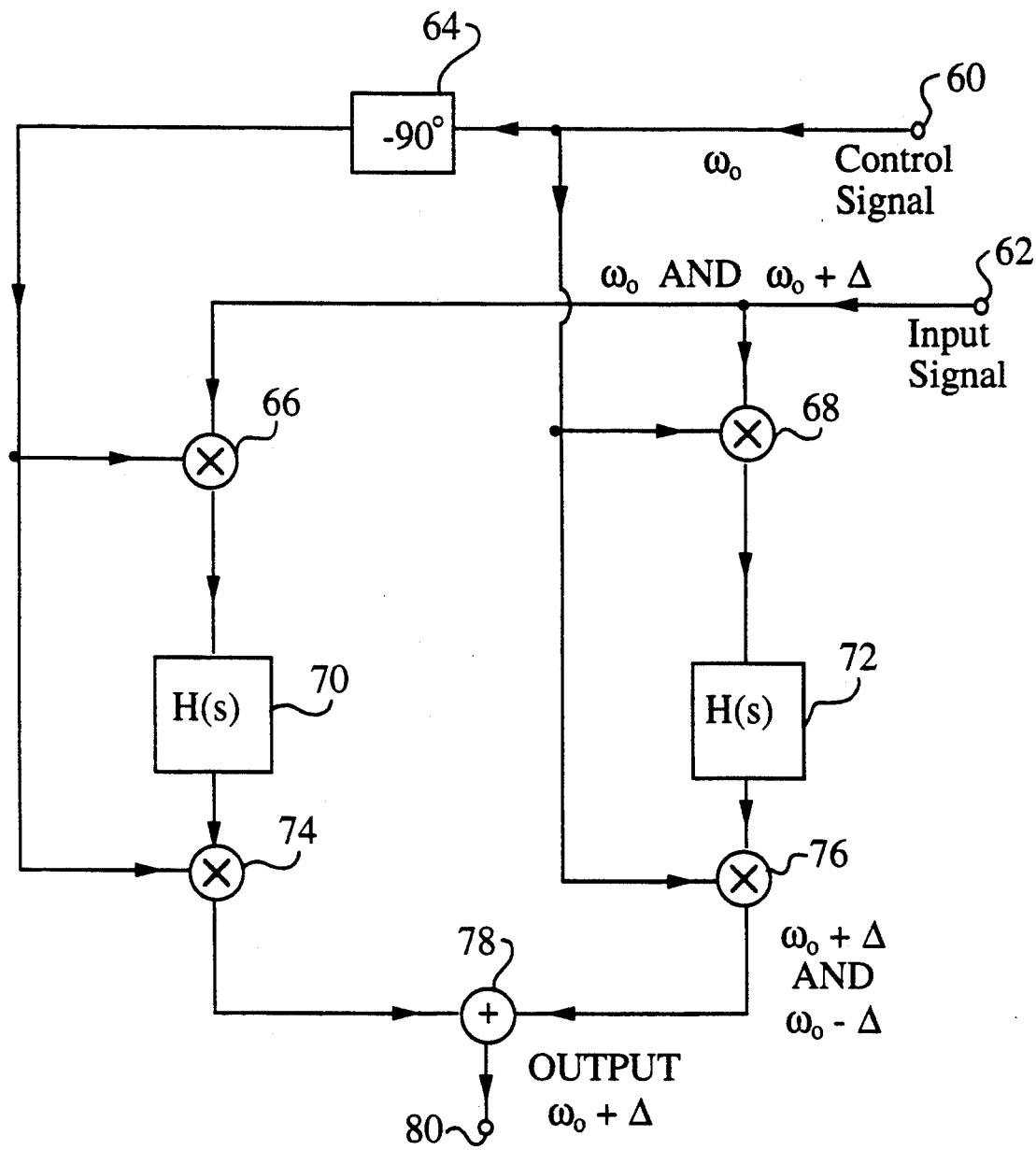
FIG. 4 is a block diagram of an adaptive notch filter embodying the present invention.

An improved adaptive notch filter in accordance with the present invention is shown in FIG. 4. The adaptive notch filter comprises an in-phase signal processing path including a mixer 68 having respective input terminals coupled to input terminal 62 and to control terminal 60, a filter 72, and a second mixer 76 having respective input terminals coupled to the output of the filter 72 and also to the control signal input terminal 60. The adaptive notch filter further comprises a quadrature signal processing path including a mixer 66 with one input terminal coupled to input terminal 62. A 90 degree phase shift circuit 64 is connected between control terminal 60 and respective inputs of mixers 66 and 74. The output of mixer 66 is further coupled to a second filter function 70, the output of which is coupled to the other input of mixer 74. The outputs of mixers 74 and 76 are summed in adder 78 which provides an output of the adaptive notch filter at terminal 80.

It should be noted that adder 78 may be eliminated in receivers in which a limiter circuit preceeds the FM demodulator. A limiter will output a preset positive signal level when the incomming signal is positive and a preset negative signal level when the signal is negative. If the filter H(s) in the quadrature path is inverting (a minor circuit change), then a subtractor would be used in place of an adder 78. Thus, the outputs of the in-phase and quadrature phase signal processing paths may be combined by either addition or subtraction, as the case may be. In the case of subtraction, a simple analog comparator, i.e. a subtractor, may replace the both the analog adder 78 and a limiter (not shown).

In operation, an input signal containing interfering stronger and weaker FM signals is applied to input terminal 62. A signal having an instantaneous angular frequency, Wo, substantially an estimate of the instantaneous angular frequency of the undesired FM signal (typically the stronger FM signal) is applied to control signal terminal 60.

The output of multiplier 68 includes the difference frequency signal representing the undesired FM interfering signal centered at zero frequency, i.e., at DC, and a sum frequency signal representing a higher frequency term. Filter 72, has a transfer function H(s) implemented by cascaded high pass and low pass filters. The low pass filter removes the high frequency term, and the high pass filter, which has a very steep rolloff at zero frequency, removes the DC term. Therefore, the output of filter 72 contains essentially the desired FM signal translated in a dynamic manner to a position in the frequency spectrum just above DC. The of filter 72 is remodulated by multiplication with the frequency Wo control signal on terminal 60 in multiplier 76. The output of multiplier 76 contains the desired FM signal at its original position in the frequency spectrum. However, as a result of the remultiplication, the output of multiplier 76 also contains an undesirable difference frequency term representing a side band of frequencies below the unwanted FM signal center frequency. The undesirable difference frequency term is too close to the desired sum frequency term to be filtered out.

In order to remove the unwanted difference frequency term, a quadrature phase adaptive notch filter signal path is provided through mixer 66, filter 70 and mixer 74, which are substantially identical to mixer 68, filter 72 and mixer 76, respectively. The difference between the two signal paths is that the quadrature phase signal path is controlled by a control signal having a 90 degree phase shift as provided by phase shifter 64. As a result, a first 90 degree phase shift is introduced by mixer 66, and a second 90 degree phase shift is introduced by mixer 74, so that the difference frequency term at the output of mixer 74 is 180 degrees out of phase with respect to the similar term at the output of mixer 76. The sum frequency term is unaffected. When the outputs of mixers 74 and 76 are added together in adder 78, the output at terminal 80 contains essentially only the sum frequency term; the difference frequency term has been substantially canceled by the out of phase signals provided by the in phase signal path and the quadrature phase signal path of the adaptive notch filter.

Figure 6:
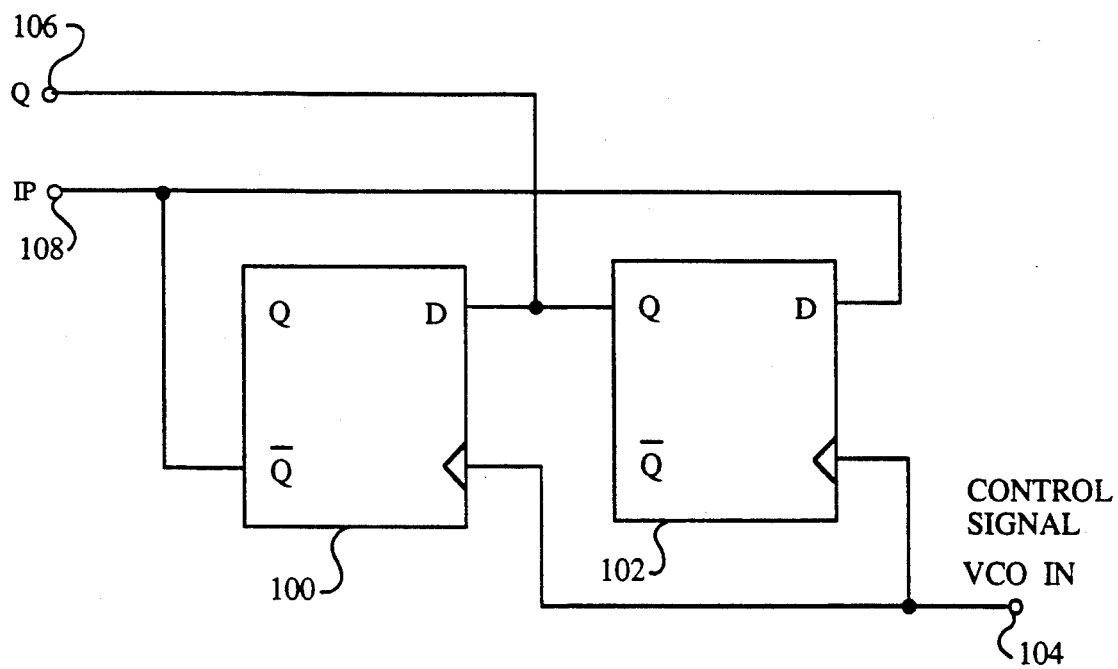
FIG. 6 is a logic diagram of a phase shift network which may be used in conjunction with the present invention.

The adaptive notch filter of the present invention lends itself to convenient integrated circuit design techniques. For example, the 90 degree phase shifter 64 may be implemented using two D type flip-flops arranged as a synchronous divide by 4 digital counter as shown in FIG. 6. It is an advantage of the present adaptive notch filter to be able to operate with a square wave control signal since the complexity of the VCO can be reduced. The VCO control signal input on terminal 104 of FIG. 6 is connected to the clock inputs of flip-flops 100 and 102. The Q output of flip-flop 102 is the quadrature phase clock, Q, on terminal 106. The Q not output of flip-flop 100 is the in-phase clock signal, IP, on terminal 108.

Figure 7A:
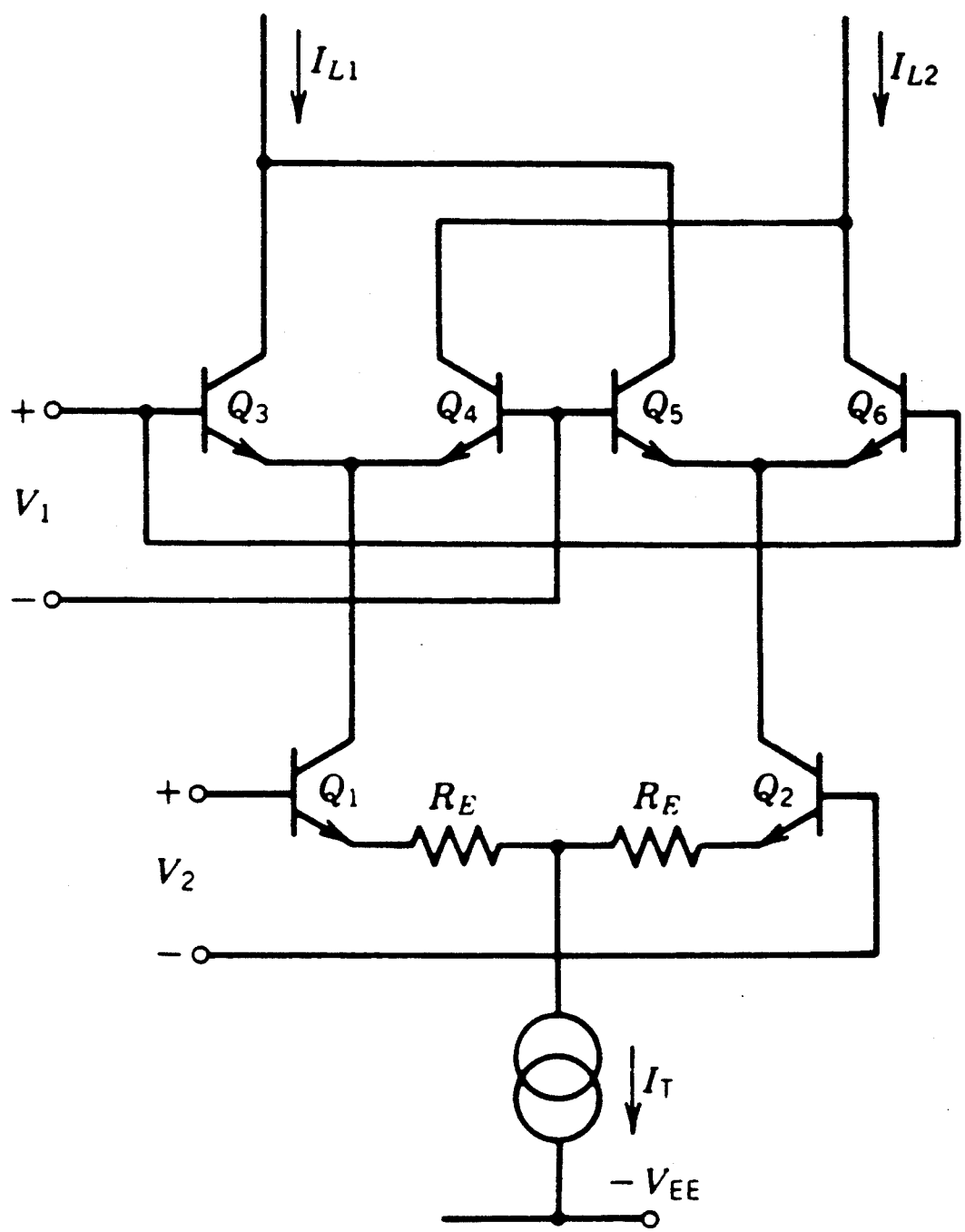
FIG. 7A is a circuit diagram of an embodiment of a multiplier circuit which may be used in conjunction with the present invention.
Figure 7B:
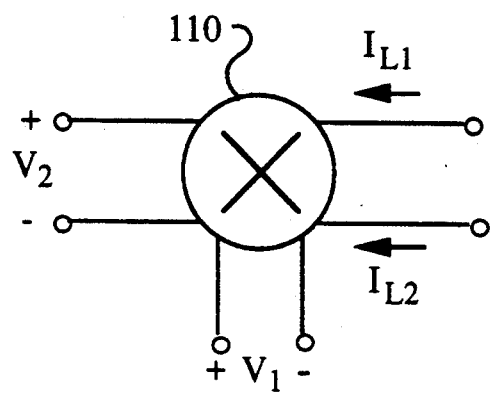
FIG. 7B shows a symbol for the circuit of FIG. 7A representing a multiplier circuit which may be used in conjunction with the present invention.

Similarly, the multipliers, or mixers used in conjunction with the present invention, can be relatively simple 7 transistor balanced modulators which also can receive square wave signals as an input. A 7 transistor balanced modulator which may be used as a multiplier in conjunction with the present invention is shown in FIGS. 7 and 7B. The multiplier consists of 7 transistors Q1 through Q7 arranged in pairs of emitter coupled differential amplifiers. A first emitter coupled differential amplifier is formed by Q3 and Q4 which receives a first voltage differential signal V1 between the base electrodes thereof. A second emitter coupled differential amplifier is formed by transistors Q5 and Q6 which receives the opposite polarity of the first voltage differential signal input V1.

The emitter coupled current source for each differential amplifier is formed by another pair of transistors Q1 and Q2 arranged as an emitter coupled differential amplifier receiving a second voltage differential signal input V2 between the base electrodes thereof. A constant current source I3 couples the emitter electrodes of Q1 and Q2 to a lower power supply potential through matched resistors RE1 and RE2. (The circuit of FIG. 7A operates as a multiplier 110 (shown symbolically in FIG. 7B) accepting two differential voltage inputs V1 and V2 and providing differential current outputs I1 and I2 representing the product of V1 and V2.

Figure 8:
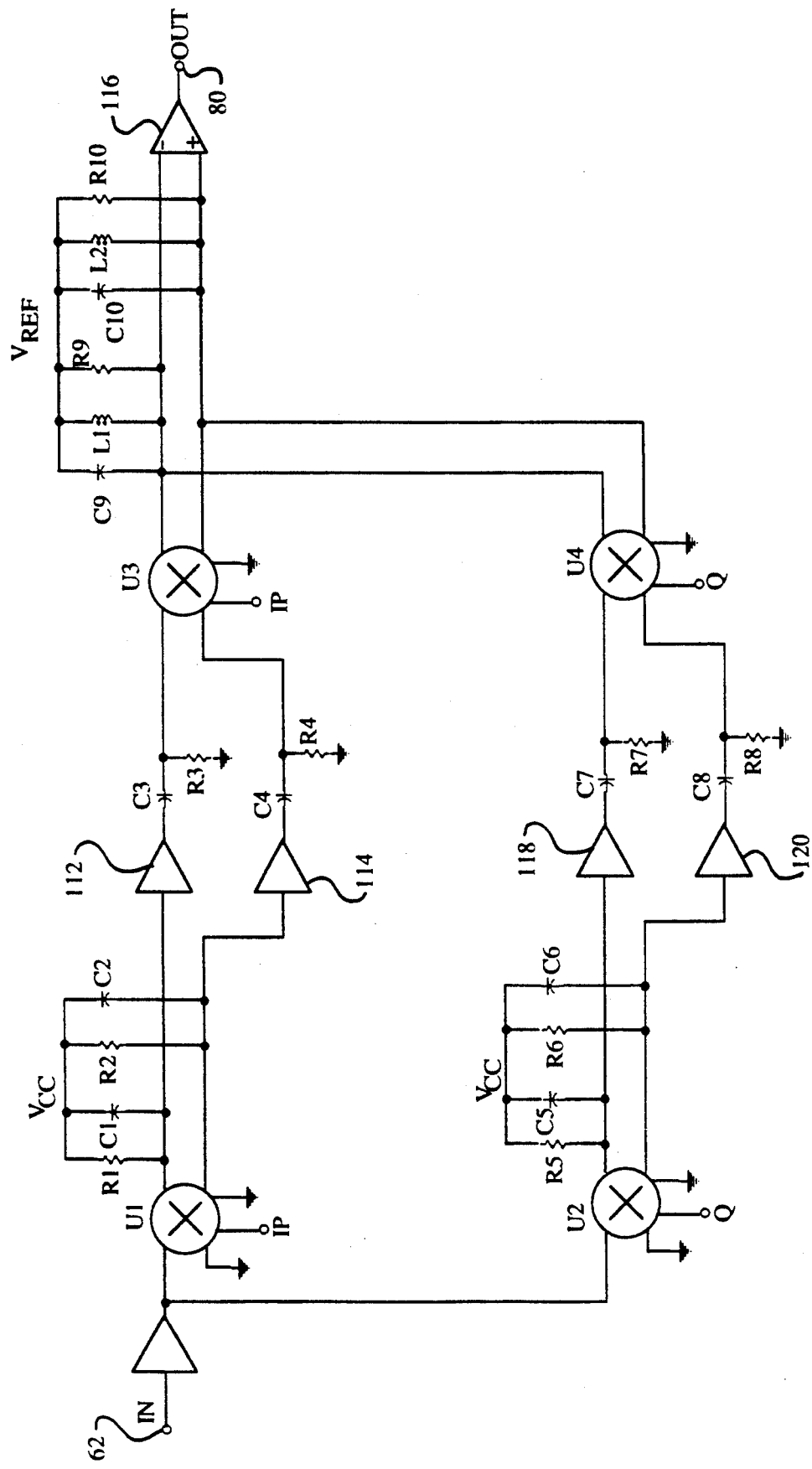
FIG. 8 is a schematic circuit diagram of an adaptive notch filter embodying the present invention.

A schematic diagram of an adaptive notch filter in accordance with the present invention is shown in FIG. 8. The signal to be filtered for cochannel FM interference is provided at terminal 62. The multipliers U1, U2, U3, and U4 receive in-phase IP and quadrature Q signals from the circuit in FIG. 6. Specifically, multipliers U1 and U2 receive the IP signal, while multipliers U2 and U4 receive the Q signal from terminals 108 and 106 in FIG. 6. As shown in FIG. 6, the IP and Q signals are generated from the adaptive notch filter frequency control signal input at terminal 104. The advantage of using flip-flops 100 and 102, which are arranged as a synchronous divide by 4 counter, is that the in-phase IP and quadrature Q signals are shifted by exactly 90 degrees.

Returning to FIG. 8, resistors R1, R2 and capacitors C1, C2 form the load for multiplier U1. In addition, the low pass filter which rejects the out of band signals at the output of multiplier U1 is also provided by this network. Resistors R1 and R2 form a passive current to voltage converter, eliminating the need for active current to voltage converter circuits. Resistor R3 and capacitor C3, as well as resistor R4 and capacitor C4 form respective high pass filters which block DC. The buffers 112 and 114 connected to the output of the multiplier U1 can be as simple as a common collector voltage follower, since a shift in the DC reference level is of no consequence in this circuit. The differential output of the respective high pass filters is connected to the input of multiplier U3. The signal path is kept fully differential throughout to maximize common mode and power supply rejection. Such considerations are important because feed through can be a major problem in a monolithic chip designed for RF signal processing.

The quadrature phase signal processing path operates in a similar manner. Resistors R5, R6 and capacitors C5, C6 form the load for multiplier U2. In addition, the low pass filter which rejects the out of band signals at the output of multiplier U2 is provided by this network. Resistors R5 and R6 form a passive current to voltage converter, eliminating the need for active current to voltage converter circuits. Resistor R7 and capacitor C7, as well as resistor R8 and capacitor C8 form respective high pass filters which block DC. The differential output of the high pass filters is connected to the input of multiplier U4.

The output of the in-phase multiplier U2 and the quadrature phase multiplier U4 are connected in parallel. Parallel connection permits the sum of the two signals to be achieved with passive components, since the current outputs of each multiplier are summed Capacitor C9 and inductor L1 (also capacitor C10 and inductor L2) form the band pass filter. Resistor R9 (also resistor R10) provide the passive current to voltage conversion. Capacitors C9 and C10, as well as inductors L1 and L2, may be off chip components. The comparator 116 which follows the multipliers U3 and U4 may be a standard comparator well known to those skilled in the art.

An adaptive notch filter in accordance with the present invention may be used in a number of applications, in which an undesired signal is to be removed. The adaptive notch filter of the present invention may be used in general signal processing applications in addition to FM cochannel interference cancellation, as may be required in a wide variety of industrial and military applications, such as communication signal processing and electronic countermeasures.

What is claimed is:

1. An FM interference cancellation system comprising:
    an input signal terminal for receiving an input signal;
    an adaptive notch filter for filtering an input signal coupled to said input signal terminal, in accordance with a control signal input, said adaptive notch filter having a respective input terminal and output terminal, said adaptive notch filter comprising:
        means for translating said input signal to form a translated input signal in the frequency domain in accordance with said input control signal;
        means for baseband filtering said translated input signal to remove a band of baseband signal frequencies between DC and a given baseband frequency, and to remove the DC component, to form a baseband filtered signal; and
        means for translating said baseband filtered signal in the frequency domain in accordance with said input control signal;
    a phase locked loop coupled to said input signal terminal for tracking the frequency of an interfering FM signal, said phase locked loop providing an output frequency control signal coupled to said control signal input of said adaptive notch filter; and
    means coupled to said output terminal of said adaptive notch filter for demodulating
    a desired,
    whereby interference caused by said interfering FM signal with said desired signal is substantially canceled.

2. An FM interference cancellation system comprising:
    an input signal terminal for receiving an input signal;
    first and second adaptive notch filters for filtering said input signal coupled to said input signal terminal, in accordance with respective input control signals, and having respective output terminals, each of said first and second adaptive notch filters comprising:
        means for translating said input signal to form a translated input signal in the frequency domain in accordance with said respective input control signal;
        means for baseband filtering said translated input signal between DC and a given baseband frequency, and to remove the DC component, to form a baseband filtered signal to remove a band of baseband signal frequencies; and
        means for translating said baseband filtered signal in the frequency domain in accordance with said respective input control signal;
    a first phase locked loop coupled to said output terminal of said second adaptive notch filter for tracking the frequency of a first FM signal, said first phase locked loop providing an output frequency control signal coupled to said input control signal of said first adaptive notch filter; and
    a second phase locked loop coupled to said output terminal of said first adaptive notch filter for tracking the frequency of a second FM signal, said second phase locked loop providing an output frequency control signal coupled to said input control signal of said second adaptive notch filter, said second FM signal being stronger than said first FM signal,
    whereby interference caused by said first FM signal to said second FM signal is substantially canceled by said first adaptive notch filter, and interference caused by said second FM signal to said first FM signal is substantially canceled by said second adaptive notch filter.

3. An FM interference cancellation system in accordance with claim 1, wherein said adaptive notch filter includes an input terminal, an output terminal, and a control input terminal, said adaptive notch filter comprising:
    a first mixer coupled to said input terminal and to said control input terminal;
    a first baseband filter coupled to said first mixer, for filtering out a band of baseband signal frequencies between DC and a given baseband frequency, and to remove the DC component;
    a second mixer coupled to said first baseband filter and to said control input terminal;
    a 90 degree phase shift circuit having an input terminal coupled to said control terminal, and an output terminal;
    a third mixer coupled to said input terminal and to said output terminal of said 90 degree phase shift circuit;
    a second baseband filter coupled to said third mixer, for filtering out a band of baseband signal frequencies between DC and a given baseband frequency, and to remove the DC component;
    a fourth mixer coupled to said second baseband filter and to said output terminal of said 90 degree phase shift circuit; and
    an adder coupled to the output of said second mixer and the output of said fourth mixer, the output of said adder coupled to said output terminal of said adaptive notch filter.

4. An FM interference cancellation system in accordance with claim 1, wherein said adaptive notch filter includes an input terminal, an output terminal, and a control input terminal, said adaptive notch filter comprising:

a first mixer coupled to said input terminal and to said control input terminal;

a first baseband filter coupled to said first mixer, for filtering out a band of baseband signal frequencies between DC and a given baseband frequency, and to remove the DC component;

a second mixer coupled to said first baseband filter and to said control input terminal;

a 90 degree phase shift circuit having an input terminal coupled to said control input terminal, and an output terminal;

a third mixer coupled to said input terminal and to said output terminal of said 90 degree phase shift circuit;

a second baseband filter coupled to said third mixer, for filtering out a band of baseband signal frequencies between DC and a given baseband frequency, and to remove the DC component;

a fourth mixer coupled to said second baseband filter and to said output terminal of said 90 degree phase shift circuit; and a comparator coupled to the output of said second mixer and the output of said fourth mixer, the output of said comparator coupled to said output terminal of said 5. An adaptive notch filter in accordance with claim 1, wherein each of said mixers comprise a balanced modulator.

6. An adaptive notch filter in accordance with claim 1, wherein said 90 degree shift circuit comprises a synchronous digital divider circuit.

7. An FM interference cancellation system in accordance with claim 2, wherein said adaptive notch filter includes an input terminal, an output terminal, and a control input terminal, said adaptive notch filter comprising:

a first mixer coupled to said input terminal and to said control input terminal;

a first baseband filter coupled to said first mixer, for filtering out a band of baseband signal frequencies between DC and a given baseband frequency, and to remove the DC component;

a second mixer coupled to said first baseband filter and to said control input terminal;

a 90 degree phase shift circuit having an input terminal coupled to said control terminal, and an output terminal;

a third mixer coupled to said input terminal and to said output terminal of said 90 degree phase shift circuit;

a second baseband filter coupled to said third mixer, for filtering out a band of baseband signal frequencies between DC and a given baseband frequency, and to remove the DC component;

a fourth mixer coupled to said second baseband filter and to said output terminal of said 90 degree phase shift circuit; and an adder coupled to the output of said second mixer and the output of said fourth mixer, the output of said adder coupled to said output terminal of said adaptive notch filter.

8. An FM interference cancellation system in accordance with claim 2, wherein said adaptive notch filter includes an input terminal, an output terminal, and a control input terminal, said adaptive notch filter comprising:

a first mixer coupled to said input terminal and to said control input terminal;

a first baseband filter coupled to said first mixer, for filtering out a band of baseband signal frequencies between DC and a given baseband frequency, and to remove the DC component;

a second mixer coupled to said first baseband filter and to said control input terminal;

a 90 degree phase shift circuit having an input terminal coupled to said control input terminal, and an output terminal;

a third mixer coupled to said input terminal and to said output terminal of said 90 degree phase shift circuit;

a second baseband filter coupled to said third mixer, for filtering out a band of baseband signal frequencies between DC and a given baseband frequency, and to remove the DC component;

a fourth mixer coupled to said second baseband filter and to said output terminal of said 90 degree phase shift circuit; and a comparator coupled to the output of said second mixer and the output of said fourth mixer, the output of said comparator coupled to said output terminal of said adaptive notch filter.

9. An adaptive notch filter in accordance with claim 2, wherein each of said mixers comprise a balanced modulator.

10. An adaptive notch filter in accordance with claim 2, wherein said 90 degree phase shift circuit comprises a synchronous digital divider circuit.

* * * * *